United States Patent
Mueller-Cristadoro et al.

(10) Patent No.: US 11,920,000 B2
(45) Date of Patent: Mar. 5, 2024

(54) ALKOXYLATED POLYAMIDOAMINES AS DISPERSANT AGENTS

(71) Applicant: BASF SE, Ludwigshafen am Rhein (DE)

(72) Inventors: Anna Mueller-Cristadoro, Lemfoerde (DE); Thomas Wesley Holcombe, Shanghai (CN); Frank Pirrung, Ludwigshafen (DE); Susanne Carina Engert, Ludwigshafen (DE); Alexander Panchenko, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 721 days.

(21) Appl. No.: 16/972,170

(22) PCT Filed: May 27, 2019

(86) PCT No.: PCT/EP2019/063593
§ 371 (c)(1),
(2) Date: Dec. 4, 2020

(87) PCT Pub. No.: WO2019/233795
PCT Pub. Date: Dec. 12, 2019

(65) Prior Publication Data
US 2021/0238349 A1    Aug. 5, 2021

(30) Foreign Application Priority Data
Jun. 6, 2018   (EP) ..................................... 18176297

(51) Int. Cl.
C08G 73/02       (2006.01)
C09D 7/45        (2018.01)
(Continued)

(52) U.S. Cl.
CPC ............. *C08G 73/028* (2013.01); *C09D 7/45* (2018.01); *C09D 7/61* (2018.01); *C09D 7/65* (2018.01);
(Continued)

(58) Field of Classification Search
CPC .......... C08G 73/028; C09D 7/45; C09D 7/61; C09D 7/65; C09D 17/001; C09D 17/002;
(Continued)

(56) References Cited

U.S. PATENT DOCUMENTS 4,546,151 A   10/1985  Baur et al.
4,935,162 A    6/1990  Barthold et al.
(Continued)

FOREIGN PATENT DOCUMENTS

CN      101328267 A    12/2008
CN      101497695 A     8/2009
(Continued)

OTHER PUBLICATIONS

International Search Report and Written Opinion for International Application No. PCT/EP2019/063593, dated Aug. 23, 2019, 10 pages.
(Continued)

*Primary Examiner* — Doris L Lee
(74) *Attorney, Agent, or Firm* — Armstrong Teasdale LLP

(57) ABSTRACT

An alkoxylated polyamidoamine obtainable by a) reacting a polycarboxylic compound having a total number TN of carboxylic groups of 3 to 10 with a primary diamine of formula I $H_2N-Z-NH_2$ wherein Z represents a bond or an organic group with 1 to 20 carbon atoms in a ratio of 0.3 TN to TN mols of the diamine per 1 mol of the polycarboxylic compound and b) alkoxylating the product obtained in a) with at least 0.5 mol of alkyleneoxide per 1 mol of primary amino groups.

14 Claims, 1 Drawing Sheet

(51) Int. Cl.
*C09D 7/61* (2018.01)
*C09D 7/65* (2018.01)
*C09D 17/00* (2006.01)

(52) U.S. Cl.
CPC ......... *C09D 17/001* (2013.01); *C09D 17/002* (2013.01); *C09D 17/005* (2013.01)

(58) Field of Classification Search
CPC .. C09D 17/005; C09D 179/02; C09D 171/02; C08K 3/013; C08K 3/04; C08L 71/02; C08L 79/02
See application file for complete search history.

(56) References Cited

U.S. PATENT DOCUMENTS

| | | | |
|---|---|---|---|
| 5,026,821 A * | 6/1991 | Boustta | A61L 26/0019 562/589 |
| 6,811,601 B2 | 11/2004 | Borzyk et al. | |
| 8,486,427 B2 | 7/2013 | Colman et al. | |
| 2004/0176499 A1 | 9/2004 | Herrmann et al. | |
| 2009/0017273 A1* | 1/2009 | Shimada | G02B 5/223 522/75 |
| 2012/0292193 A1 | 11/2012 | Roeger-Goepfert et al. | |
| 2020/0231752 A1 | 7/2020 | Putzien et al. | |

FOREIGN PATENT DOCUMENTS

| | | |
|---|---|---|
| EP | 0264755 A1 | 4/1988 |
| EP | 1132440 A2 | 9/2001 |
| EP | 1454964 A1 | 9/2004 |
| GB | 570858 A | 8/1945 |
| RU | 2574959 C2 | 2/2016 |
| WO | 0192421 A1 | 12/2001 |
| WO | WO 2009/079387 * | 6/2009 |
| WO | 2014012812 A1 | 1/2014 |
| WO | 2016062578 A1 | 4/2016 |
| WO | 2017045987 A1 | 3/2017 |

OTHER PUBLICATIONS

Lee, et al., "Novye lineinye polimery [Novel Linear Polymers]", Khimia, Moscow, 1972, 8 pages. English translation unavailable. See NPL2 and NPL3 for concise explanation of relevance.
Office Action for Russian App. No. 2020143129, dated Nov. 10, 2022. Concise explanation of relevance for NPL1 (Lee et al.).
Communication re: Russian App. No. 2020143129, dated Jan. 13, 2023. Concise explanation of relevance for NPL1 (Lee et al.).
Lee, et al., "Novye lineinye polimery [Novel Linear Polymers]", Khimia, Moscow, 1972, 8 pages.

\* cited by examiner

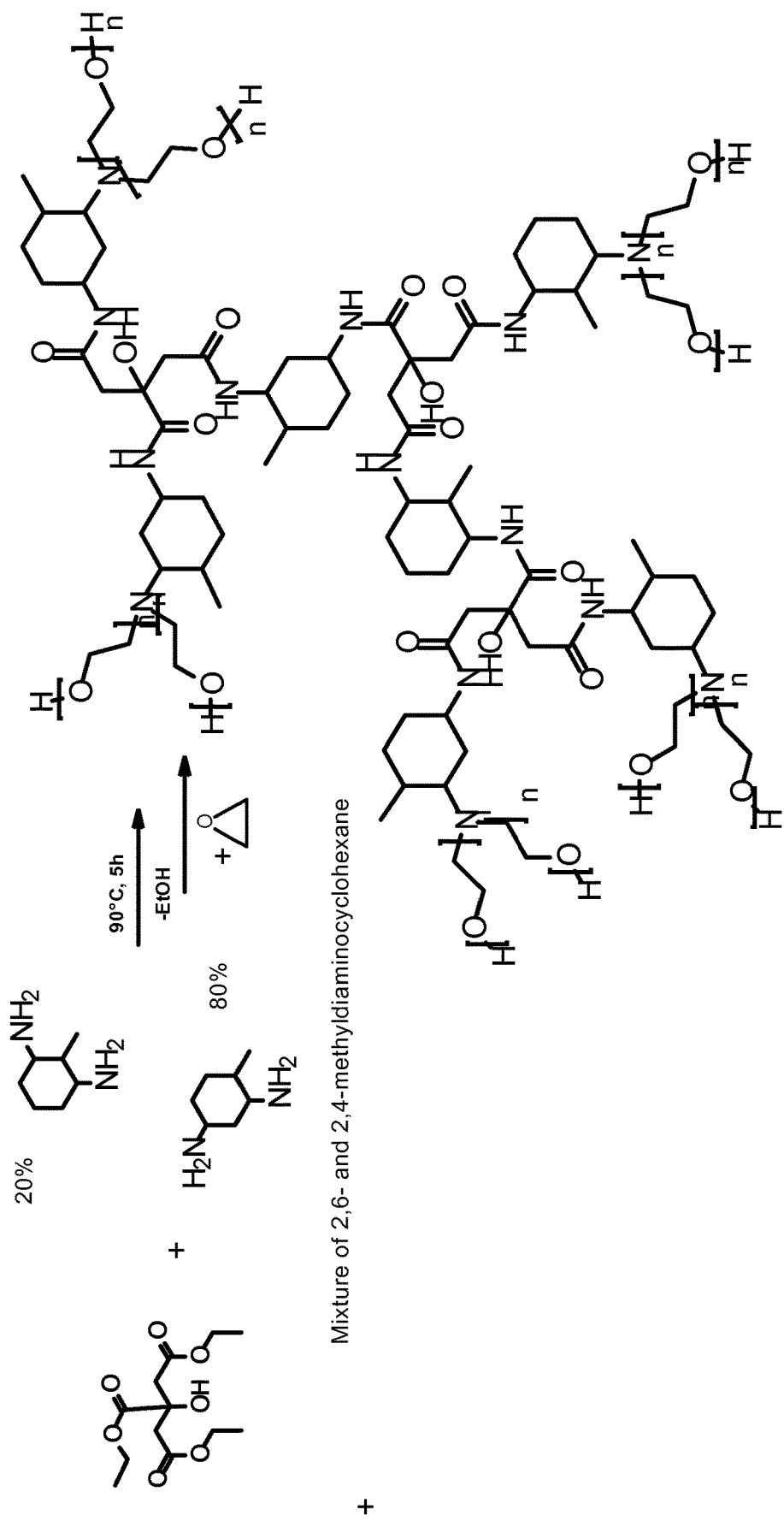

ALKOXYLATED POLYAMIDOAMINES AS DISPERSANT AGENTS

CROSS-REFERENCE TO RELATED APPLICATIONS

This application is a U.S. National Phase Application of International Patent Application No. PCT/EP2019/063593, filed May 27, 2019, which claims the benefit of priority to European Patent Application No. 18176297.2, filed Jun. 6, 2018, the entire contents of which are hereby incorporated by reference herein.

The present invention relates to an alkoxylated polyamidoamine which is obtainable by
  a) reacting a polycarboxylic compound having a total number TN of carboxylic groups of 3 to 10 with a primary diamine of formula I

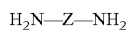
  $H_2N-Z-NH_2$ wherein Z represents a bond or an organic group with 1 to 20 carbon atoms
  in a ratio of 0.3 TN to TN mols of the diamine per 1 mol of the polycarboxylic compound
  and
  b) alkoxylating the product obtained in a) with at least 0.5 mol of alkylene oxide per 1 mol of primary amino groups.

Pigment dispersions are used in a variety of technical applications. Notably they are used in water or solvent based coating compositions, such as paints or inks.

Pigment dispersions should have a very concentration of pigments. Usually a dispersant is used for the preparation of pigment dispersions. The dispersant should be very effective to disperse the pigment in the solvent selected. Dispersants are desired that disperse pigments in water as well as in organic solvents. The chemical synthesis of the dispersant should be easy and should not require any starting materials of low accessibility or starting materials that are problematic regarding toxicity or pollution of the environment or are otherwise hazardous. Furthermore, the dispersant should allow the preparation of pigment dispersions of high homogeneity and low particle size of the distributed pigment particles. Finally, the use of the pigment dispersions obtained should have no negative impact on the application properties of the water or solvent based coating compositions.

A variety of dispersants is already known, including alkoxylated compounds such as alkoxylated polyethyleneimines. For example, EP-A 1454964, EP-A 1132440, and WO 01/92421 disclose pigment dispersions comprising alkoxylated polyethyleneimines and the use of such pigment dispersions in various coating compositions. WO 2014/012812 discloses polycondensation products of trialkanolamine as dispersant for pigment dispersions.

Polyamidoamines on basis of a tricarboxylic compound are known from WO 2017/045987, U.S. Pat. No. 5,026,821, CN 101497695 and CN 101328267. The polyamidoamines are used as crosslinker for polymers. WO 2017/045987, U.S. Pat. No. 5,026,821, CN 101497695 and CN 101328267 do not disclose the use of polyamidoamines as dispersant. Furthermore, WO 2017/045987, U.S. Pat. No. 5,026,821, CN 101497695 and CN 101328267 do not disclose the synthesis of alkyoxylated polyamidoamines.

It was an object of this invention to provide alternative dispersants that fulfill the above demands and requirements as good as possible.

Accordingly, the polyalkoxylated amidoamine described above and its use as dispersant has been found.

To Process Step a)

In process step a) a polycarboxylic compound having a total number TN of carboxylic groups of 3 to 10 is reacted with a primary diamine of formula I

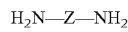
$H_2N-Z-NH_2$ wherein Z represents a bond or an organic group with 1 to 20 carbon atoms in a ratio of 0.3 TN to TN mols of the diamine per 1 mol of the polycarboxylic compound.

The carboxylic groups are preferably selected from carboxylic acid groups, carboxylic halogenid groups, carboxylic ester groups or carboxylic anhydride groups or mixtures thereof, whereby a carboxylic anhydride group corresponds to two carboxylic groups.

More preferably, the carboxylic groups are carboxylic ester groups, notably carboxylic alkyl ester groups of formula $-C(=O)-O-Y$ with Y being an alkyl group, preferably an alkyl group with 1 to 10 carbon atoms, more preferably with 1 to 4 carbon atoms.

In a preferred embodiment, the polyarboxylic compound comprises 3 to 6 carboxylic groups. In a more preferred embodiment, the polyarboxylic compound comprises 3 or 4 carboxylic groups. In a most preferred embodiment the polycarboxylic compound comprises 3 carboxylic groups.

Preferably, the polycarboxylic compound is a hydrocarbon that comprises the carboxylic groups but no other heteroatoms or functional groups.

Preferably, the polycarboxylic compound has a molecular weight below 2000 g/mol, particularly below 1000 g/mol and more preferably below 500 g/mol.

Polycarboxylic compounds are, for example, citric acid, isocitric acid, aconitic acid, propane, 1,2,3 tricarboxylic acid, trimesic acid, trimellytic acid, trimellytic anhydride, cyclobutane and cyclopentane-1,2,3,4-tenotetracarboxylic acid, and of benzene-1,2,4,5-tetracarboxylic acids, benzophenone-3,3',4,4'-tetracarboxylic dianhydride and their anhydrides, Ethylendiamine tetraacetic acid (EDTA).

Further examples of polycarboxylic compounds are polycarboxylic acids and anhydrides, as, for example, 1,2,3-benzenetricarboxylic acid and 1,2,3-benzenetricarboxylic dianhydride, 1,3,5-benzenetricarboxylic acid (trimesic acid), preferably 1,2,4-benzenetricarboxylic acid (trimellitic acid), trimellitic anhydride and, in particular, 1,2,4,5-benzenetetracarboxylic acid (pyromellitic acid) and 1,2,4,5-benzenetetracarboxylic dianhydride (pyromellitic dianhydride), 3,3',4,4"-benzophenonetetracarboxylic acid, 3,3',4, 4"-benzophenonetetracarboxylic dianhydride, in addition benzenehexacarboxylic acid (mellitic acid) and anhydrides of mellitic acid.

Other suitable polycarboxylic acids and anhydrides thereof are mellophanic acid and mellophanic anhydride, 1,2,3,4-benzenetetracarboxylic acid and 1,2,3,4-benzenetetracarboxylic dianhydride, 3,3,4,4-biphenyltetracarboxylic acid and 3,3,4,4-biphenyltetracarboxylic dianhydride, 2,2,3, 3-biphenyltetracarboxylic acid and 2,2,3,3-biphenyltetracarboxylic dianhydride, 1,4,5,8-naphthalenetetracarboxylic acid and 1,4,5,8-naphthalenetetracarboxylic dianhydride, 1,2,4,5-naphthalenetetracarboxylic acid and 1,2,4,5-naphthalenetetracarboxylic dianhydride, 2,3,6,7-naphthalenetetracarboxylic acid and 2,3,6,7-naphthalenetetracarboxylic dianhydride, 1,4,5,8-decahydronaphthalenetetracarboxylic acid and 1,4,5,8-decahydronaphthalenetetracarboxylic dianhydride, 4,8-dimethyl-1,2,3,5,6,7-hexahydronaphthalene-1, 2,5,6-tetracarboxylic acid and 4,8-dimethyl-1,2,3,5,6,7-hexahydronaphthalene-1,2,5,6-tetracarboxylic dianhydride, 2,6-dichloronaphthalene-1,4,5,8-tetracarboxylic acid and 2,6-dichloronaphthalene-1,4,5,8-tetracarboxylic dianhydride, 2,7-dichloronaphthalene-1,4,5,8-tetracarboxylic acid and 2,7-dichloronaphthalene-1,4,5,8-tetracarboxylic dianhydride, 2,3,6,7-tetrachloronaphthalene-1,4,5,8-tetracarboxylic acid and 2,3,6,7-tetrachloronaphthalene-1,4,5,8-tetracarboxylic dianhydride, 1,3,9,10-phenanthrenetetracarboxylic acid and 1,3,9,10-phenanthrenetetracarboxylic dianhydride, 3,4,9,10-perylenetetracarboxylic acid and 3,4,9,10-perylenetetracarboxylic dianhydride, bis(2,3-dicarboxyphenyl)methane and bis(2,3-dicarboxyphenyl)methane dianhydride, bis(3,4-dicarboxyphenyl)methane and bis(3,4-dicarboxyphenyl)methane dianhydride, 1,1-bis(2,3-dicarboxyphenyl)ethane and 1,1-bis(2,3-dicarboxyphenyl)ethane dianhydride, 1,1-bis(3,4-dicarboxyphenyl)ethane and 1,1-bis(3,4-dicarboxyphenyl)ethane dianhydride, 2,2-bis(2,3-dicarboxyphenyl)propane and 2,2-bis(2,3-dicarboxyphenyl)propane dianhydride, 2,3-bis(3,4-dicarboxyphenyl)propane and 2,3-bis(3,4-dicarboxyphenyl)propane dianhydride, bis(3,4-carboxyphenyl)sulfone and bis(3,4-carboxyphenyl)sulfone dianhydride, bis(3,4-carboxyphenyl) ether and bis(3,4-carboxyphenyl) ether dianhydride, ethylenetetracarboxylic acid and ethylenetetracarboxylic dianhydride, 1,2,3,4-butanetetracarboxylic acid and 1,2,3,4-butanetetracarboxylic dianhydride, 1,2,3,4-cyclopentanetetracarboxylic acid and 1,2,3,4-cyclopentanetetracarboxylic dianhydride, 2,3,4,5-pyrrolidinetetracarboxylic acid and 2,3,4,5-pyrrolidinetetracarboxylic dianhydride, 2,3,5,6-pyrazinetetracarboxylic acid and 2,3,5,6-pyrazinetetracarboxylic dianhydride, 2,3,4,5-thiophenetetracarboxylic acid and 2,3,4,5-thiophenetetracarboxylic dianhydride.

Further examples of polycarboxylic compounds are polycarboxylic acid esters which correspond to the esters of the above mentioned polycarboxylic acids and anhydrides. Preferably, the carboxylic ester groups of such polycarboxylic acid esters are alkyl ester groups wherein the alkyl is an alkyl with 1 to 10 carbon atoms, more preferably with 1 to 4 carbon atoms.

A preferred polycarboxylic compound is a compound of formula II

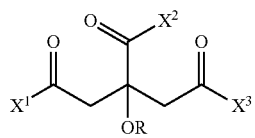

wherein $X^1$ to $X^3$ independently from each other represent a halogenid, cyanide (CEN) or a group O—$R^1$ with $R^1$ being hydrogen or an organic group with at maximum 30 carbon atoms and R represents hydrogen or a group C(=O)—$R^2$ with $R^2$ being an organic group with at maximum 30 carbon atoms.

Preferably, R is hydrogen or a group C(=O)—$R^2$ with $R^2$ being an alkyl group with 1 to 10 carbon atoms, notably 1 to 4 carbon atoms.

More preferably, R is hydrogen.

Preferably, $X^1$ to $X^3$ independently from each other represent a chloride or a group O—$R^1$.

Preferably, $R^1$ is hydrogen or an alkyl group with 1 to 10 carbon atoms, notably 1 to 4 carbon atoms.

More preferably, $X^1$ to $X^3$ independently from each other represent Cl or a group O—$R^1$ with $R^1$ being hydrogen, methyl, ethyl, n-propyl, or iso-propyl.

Most preferably, $X^1$ to $X^3$ independently from each other represent a group O—$R^1$ with $R^1$ being hydrogen, methyl, ethyl, n-propyl, or iso-propyl, notably with $R^1$ being ethyl.

The polycarboxylic compound is reacted with the primary diamine of formula I.

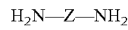

wherein Z represents a bond or an organic group with 1 to 20 carbon atoms, notably with 1 to 10 carbon atoms.

Preferably, Z is a hydrocarbon and does not comprise other atoms than hydrogen and carbon; notably Z is an aliphatic hydrocarbon.

More preferably, Z is an aliphatic hydrocarbon group comprising a cycloaliphatic ring system. The cycloaliphatic ring system is preferably a cyclohexyl ring, which may be substituted by one to three, notably one or two alkyl groups. The alkyl groups may be C1- to C6-alkyl groups, notably the alkyl groups are methyl or ethyl.

In a most preferred embodiment, the diamine of formula I is 1-methyl-2,4-diamine-cyclohexane, 1-methyl-2,6-diamine-cyclohexane or mixtures thereof. Mixtures of 1-methyl-2,4-diamine-cyclohexane and 1-methyl-2,6-diamine-cyclohexane are available from the corresponding mixtures of 2,6- and 2,4-diamino toluene by hydrogenation.

The primary diamine and the polycarboxylic compound are reacted to form a compound with amido groups and amino groups, known as amidoamine or polyamidoamine. The reaction of the primary amino groups with the carboxylic group is well known and results in amido groups.

0.3 TN to TN mol of the primary diamine are reacted with the polycarboxylic compound. TN is the total number of carboxyclic groups of the polycarboxylic compound.

For example, in case of a polycarboxylic compound with TN=3, the molar amount of the diamine is from 0.9 (resulting from 0.3×TN=0.9) to 3 (corresponding to TN).

Reacting a polycarboxylic compound having 3 carboxylic groups with 3 mols of a primary diamine may result in a defined polyamidoamine having 3 amido groups and 3 primary amino groups and being formed from exactly one mol of the polycarboxylic compound and 3 mols of the primary diamine. Using less than 3 mols of a primary diamine usually results in a polyamidoamine with a higher molecular weight as more amino groups of the primary diamine are consumed to form amido groups and thus connecting polycarboxylic compounds.

Preferably, the polycarboxylic compound and the diamine are reacted in a ratio of 0.3 TN to 0.98 TN mols of the diamine per 1 mol of the polycarboxylic compound.

More preferably, the polycarboxylic compound and the diamine are reacted in a ratio of 0.3 TN to 0.86 TN mols of the diamine per 1 mol of the polycarboxylic compound.

Most preferably, the polycarboxylic compound and the diamine are reacted in a ratio of 0.3 TN to 0.8 TN mols of the diamine per 1 mol of the polycarboxylic compound.

The reaction of the diamine and polycarboxylic compound may be performed with or without the use of a solvent. The reaction is preferably performed without solvent, if the polycarboxylic compound and the diamine are liquid at 21° C., 1 bar.

In the reaction, a catalyst may be used. However, due to the reactivity of the primary amino groups and carboxyl groups, a catalyst is usually not required. Catalysts that might be used are, for example sodium hypohoshite or any other amidation catalysts known.

The reaction may be performed at normal pressure (1 bar). A reduced pressure may be helpful to withdraw low boiling compounds such as water (in case of reacting a polycarboxylic compound with carboxylic acid groups) or alcohol such as ethanol (in case of reacting a polycarboxylic compound with carboxylic acid ester groups).

The reaction may be performed at elevated temperatures. Preferably, the reaction is performed at a temperature of 50 to 150° C., specifically of 80 to 120° C.

Preferably, the reaction is performed under exclusion of oxygen. The reaction may be performed, for example, under nitrogen.

The polyamidoamine obtained from process step a) may be liquid or solid at 21° C., 1 bar.

No further work-up is necessary if no solvent has been used. Otherwise the solvent may be removed during or after the reaction.

The polyamidoamine obtained in step a) has preferably an amino number of 100 to 1500 mg KOH/g of polyamidoamine.

More preferably, the polyamidoamine obtained in step a) has an amino number of 100 to 800 mg KOH/g of polyamidoamine.

The amino number does not include the amido groups of the polyamidoamine.

Hence, the amino number corresponds to the number of amino groups of the polyamidoamine which may be alkoxylated in step b).

The amino number was determined by titration. It was determined as described in WO 2016/062578 according to the formula given on page 13 of WO 2016/062578:

Calculation:

$$\text{Amine number} = \frac{(V_P - V_B) \cdot t \cdot c \cdot 56.1}{E} = \frac{(V_P - V_B) \cdot t}{E} \cdot 5.61$$

with

Amine number=Fraction of total amine, calculated as mg KOH/g $V_P$=Consumption of standard solution up to the inflection point [ml]

$V_B$=Consumption of standard solution in blank value titration [ml]

t=titer of the standard solution c=concentration of the standard solution [=0.1 mol/l]

56.1=molar weight of KOH [g/mol]

E=weight of sample taken [g].

To Process Step b)

In process step b) the polyamidoamine obtained from process step a) is alkoxylated with at least 0.5 mol of alkyleneoxide per 1 mol of primary amino groups of the polyamidoamine. 0.5 corresponds to the average degree of alkoxylation of all primary amino groups of the polyamidoamine obtained in step a) which is referred to as "degree of alkoxylation" hereinafter.

Alkoxylation with an alkyleneoxide results in a group HO(—Z—O)$_n$— bonded to the nitrogen atom of the formerly primary amino group. Z is the alkylene group of the alkyleneoxide and n is an integral number.

As a primary amino has two reactive hydrogen atoms, both hydrogen groups may be replaced by a group HO(—Z—O)$_n$—.

Hence, a degree of alkoxylation of, for example, 2 includes the case that a specific formerly primary amino group bears two groups HO(—Z—O)$_n$— with n being 1 and has turned into a tertiary amino group or the case that a formerly primary amino group bears only one group HO(—Z—O)$_n$— with n being 2 and has turned into become a secondary amino group.

The alkyleneoxide is preferably an alkyleneoxide with 2 to 6 carbon atoms. In a particularly preferred embodiment, the alkyleneoxide is ethyleneoxide, propyleneoxide or mixtures thereof.

In a most preferred embodiment, the alkyleneoxide is ethyleneoxide.

The alkoxylation of primary amino groups is a well-known process and may be performed according to procedures described in the art.

Preferably, the alkoxylation is performed in two steps. In a first step the amino groups of the polyamidoamine are preferably reacted with alkylenoxide in the presence of water as catalyst; thus obtaining amino groups at least partially substituted by hydroxy alkyl groups. The hydroxy alkyl groups and remaining primary or secondary amino groups are then further alkoxylated in a second step by reacting the hydroxy alky groups with further alkylenoxide in presence of a catalyst which is preferably an alkali or earth alkali hydroxide. Preferably, any water (for example water from the first step or water introduced as solvent of the alkali or earth alkali hydroxide) is removed from the reaction mixture before the reaction of the second step is started.

A solvent may be used in process step b) if desired, notably if the polyamidoamine used as starting material is solid at the temperature of the reaction in step b), see below. A suitable solvent may be, for example, toluene.

The alkoxylation is preferably performed at elevated temperatures, notably at a temperature of 50 to 150° C., specifically of 80 to 130° C.

Preferably, the reaction is performed under exclusion of oxygen. The reaction may be performed, for example, under nitrogen.

In a preferred embodiment, process step b) is performed semi-continuously, whereby the total amount of the polyamidoamine is charged to a reactor and the alkylenoxide is added continuously during the reaction time.

A product mixture is obtained that may comprise volatile compounds, for example water. Any volatile compounds may be removed by distillation, preferably in vacuo at elevated temperatures.

The alkoxylated polyamidoamine obtained may be liquid or solid at 21° C., 1 bar.

Preferably, the degree of alkoxylation of the alkoxylated polyamidoamine is 0.5 to 100 mols of alkyleneoxide per 1 mol of primary amino groups, more preferably 5 to 80 mols of alkyleneoxide per 1 mol of primary amino groups.

Most preferably, the degree of alkoxylation of the primary amino groups of the polyamidoamine obtained in step a) is 10 to 60 mols of alkyleneoxide per 1 mol of primary amino groups.

The alkoxylated polyamidoamine obtained has preferably a number average molecular weight (Mn) of 300 to 50.000, more preferably of 300 to 10.000 and most preferably of 500 to 5.000 g/mol.

The number average molecular weight has been determined by gel permeation chromatography using tetrahydrofurabe as solvent. The system was calibrated in the molecular weight range of 682 to 2520000 g/mol using linear polystyrene standards.

FIG. 1 exemplarily shows an alkoxylated polyamidoamine obtained by process steps a) and b) from a polycarboxylic compound of formula II and a mixture of 1-methyl-2,4-diamine-cyclohexane and 1-methyl-2,6-diamine-cyclohexane and ethylene oxide.

Use of the Alkoxylated Polyamidoamine as Dispersant

The alkoxylated polyamidoamine may be used as dispersant, notably as dispersant for solid particles in liquid compositions.

The solid particles may be organic or inorganic particles. The liquid compositions may be compositions comprising water as solvent or compositions comprising organic solvents.

Preferably, the solid particles have an average particle diameter in the range of from 20 nm to 50 μm, more preferably of 50 nm to 20 μm and most preferably of 50 nm to 5 μm. The average particle diameter corresponds to the d50 value of the particle seize distribution (50% by weight of all particles having a particle diameter higher than the d50 value and 50% by weight of all particles having a particle diameter lower than the d50 value).

In a preferred embodiment, the alkoxylated polyamidoamine is used as dispersant for the preparation of pigment dispersions. Pigments are used, for example, in coating compositions. Usually, a pigment dispersion is prepared first and the pigment dispersion obtained is then added to a coating composition.

The pigment may be an organic or inorganic pigment. The term "pigment" shall include fillers. Fillers are organic or inorganic particles that are used to increase the volume of a coating composition and thus reduce the amount of chemical binders required.

Preferred pigment dispersions comprise
a pigment,
the alkoxylated polyamidoamine and
a solvent selected from water, organic solvents or mixtures thereof.

Organic pigments are, for example, monoazo pigments, disazo pigments, anthanthrone pigments, anthraquinone pigments, anthrapyrimidine pigments, quinacridone pigments, quinophthalone pigments, dioxazine pigments, flavanthrone pigments, indanthrone pigments, isoindoline pigments, isoindolinone pigments, isoviolanthrone pigments, metal complex pigments, perinone pigments, perylene pigments, phthalocyanine pigments, pyranthrone pigments, thioindigo pigments and triarylcarbonium pigments.

Inorganic pigments are, for example,
white pigments such as titanium dioxide, zinc white, zinc oxide; zinc sulfide, lithopone; lead white, barium sulfate and calcium carbonate;
black pigments, such as iron oxide black, iron manganese black, spinel black and carbon black;
colour pigments, such as chromium oxide, chromium oxide hydrate green, chrome green cobalt green, ultramarine green, cobalt blue, ultramarine blue, iron blue, manganese blue, ultramarine violet, cobalt violet, manganese violet, iron oxide read, cadmium sulfoselenide, molybdate read ultramarine read, iron oxide brown, mixed brown, spinel- and Korundum phases, chrome orange; iron oxide yellow, nickel titanium yellow, chrome titanium yellow, cadmium sulfide and cadmium zinc sulfide, chrome yellow, zinc yellow, alkaline earth metal chromates, Naples yellow, bismuth vanadate;
interference pigments, such as metallic effect pigments based on coated metal platelets, pearl luster pigments based on mica platelets coated with metal oxide, and liquid crystal pigments.

Inorganic pigments are preferred; notably inorganic pigments selected from inorganic yellow pigments and inorganic white pigments, especially titanium dioxide, barium sulfate and calcium carbonate.

The pigment dispersion may comprise a mixture of different pigments. A more detailed list of pigments is found in WO 2014/012812 which is incorporated by reference.

The pigments dispersions comprise the above alkoxylated polyamidoamine.

Preferably, the pigment dispersions comprise the alkoxylated polyamidoamine in an amount of 0.1 to 200 parts by weight per 100 parts by weight of pigments More preferably, the pigment dispersions comprise the alkoxylated polyamidoamine in an amount of 1 to 150 parts by weight per 100 parts by weight of pigments.

Most preferably, the pigment dispersions comprise the alkoxylated polyamidoamine in an amount of 2 to 120 parts by weight per 100 parts by weight of pigments.

The pigment dispersions may comprise further dispersants.

In a preferred embodiment, at least 50%, more preferably at least 80% by weight of all dispersants in the pigment dispersion are the alkoxylated polyamidoamines above.

In a most preferred embodiment of the invention, no other dispersants are used and the alkoxylated polyamidoamines are the only dispersants in the pigment dispersion.

The pigment dispersions comprise a solvent selected from water, organic solvents or mixtures thereof. Organic solvents may be hydrohilic or hydrophobic organic solvents. Preferred are water or hydrophilic organic solvents that are miscible with water in any ratio or mixtures thereof. Such solvents are, for example, n-butylacetate, methoxypropanol, methoxypropyl acetate, ethylacetate, isopropanol, isobutanol, butylglycol, ethanol, aceton, methylethylketone, diisobutylketone, di methylsulfoxide, N-methylpyrrolidone, polyethylene- and polypropylene-glycols, alkylbenzenes, xylene, toluene, and the like.

Most preferred is water.

The pigment dispersions comprise the solvent preferably in an amount to obtain pigment dispersions with a solids content of from 1 to 85% by weight, preferably 20 to 50% by weight.

The pigment dispersions may comprise further additives, for example biocides and wetting agents.

The pigment dispersion may be prepared by mixing the pigments, the alkoxylated polyamidoamine, the solvent and optionally other dispersant and further additives in a dispersing apparatus.

Examples for dispersing apparatuses are mills, such as rotor stator mills, ball mills, bead mills, sand mills, planetary mills, double chamber mills, three roll mills, and stirred ball mills. Further examples for dispersing apparatuses are kneaders, dissolvers, kneader-mixers, planetary kneaders, vat kneaders, and Skandex shakers. Preference is given to ball mills, bead mills, and stirred ball mills.

The pigment dispersions may be prepared at a temperature of, for example, 5 to 80° C. The mixing of the components in the dispersing apparatus may, for example, be performed for a time of 1 minute to 24 hours, in case of ball mills or stirred ball mills as dispersing apparatus preferably for a time of 1 to 10 hours, or, in case of three roll mills, for a time of 2 to 10 minutes.

The pigment dispersions are preferably used for the preparation of aqueous or organic solvent based coating compositions, adhesives or sealants.

Coating compositions, adhesives or sealants usually comprise a binder which is preferably an organic compound, such as a polymer, an oligomer or a monomer or a mixture thereof. Monomers and oligomers are usually reacted to become a polymer (by polymerization or crosslinking reactions) after applying the coating composition to a substrate surface. Organic polymers used as binders are notably alkyd resins, polyurethane, polyurea, polymers obtained by radical or ionic polymerization processes, such as poly(meth)acrylics, polyester or epoxy resins.

The pigment dispersions may be added to the coating compositions, adhesives or sealants and mixed with the other components in any manner known in the art.

The obtained coating compositions, adhesives or sealants may comprise the pigments in an amount of, for example, 1 to 1000 parts by weight, preferably 5 to 500 parts by weight and notably in an amount of 10 to 200 parts by weight per 100 parts by weight of the binder.

The alkoxylated polyamidoamine of this invention are easy to prepare the raw materials are easily accessible and may be obtained from renewable sources.

The alkoxylated polyamidoamine have high suitability as dispersants, although their amino density is low, often lower than the amino density of alkoxylated polyethylenimines.

The pigment dispersions have high stability, low viscosity and are very useful to equip coating compositions, adhesives or sealants with pigments.

The coating compositions, adhesives or sealants obtained have good applicability and result in coatings, laminates or seals with high gloss and good mechanical properties. The cured coatings are homogeneous, show no defects and have good appearance.

EXAMPLES

Synthesis of Polymers

Example 1: Polyamidoamine 1

138.15 g of triethylcitrate were placed in a 500 mL four-necked flask equipped with a stirrer a condensation column, a thermometer and a Nitrogen inlet. 179.51 g of Methyldiaminocyclohexane were added dropwise to the reaction flask within 10 minutes under stirring. The reaction mixture was slowly heated up to 95 C (external temperature) and kept at this temperature under stirring for 5 Hours under nitrogen. Ethanol was collected as distillate. Then the pressure within the reactor was gradually reduced to 40 mbar and the reaction was continued for 2 and ½ hours under stirring. Then, the temperature of the external heat source was slowly increased to 112 C and kept 2 hours under stirring. Ethanol was further collected as distillate. The reaction temperature was then reduced to room temperature and 284.5 g of fluid product were collected.

The polymer was characterized via Gel Permeation Chromatography in hexafluoroisopropanol and amino numbers:
Mn: 341 g/mol
Mw: 1000 g/mol
PD*: 2.9
Amino number**: 458 mgKOH/g
Viscosity: 300 mPas @ 23 C and 100 1/s
PD: polydispersity (Mw/Mn)

Example 2: Polyamidoamine 2

331.55 g of triethylcitrate were placed in a 1 L four-necked flask equipped with a stirrer a condensation column, a thermometer and a Nitrogen inlet. 430.82 g of Methyldiaminocyclohexane were added dropwise to the reaction flask within 20 minutes under stirring. The reaction mixture was slowly heated up to 143 C (external temperature) and kept at this temperature under stirring for 6 hours. Ethanol was collected as distillate. Then the temperature of the external heat source was reduced to 105 C and slowly the pressure was reduced to 250 mbar within 1½ hour. Ethanol was further collected as distillate. The reaction temperature was then reduced to room temperature and 623 g of viscous fluid product were collected.

The polymer was characterized via Gel Permeation Chromatography in hexafluoroisopropanol.
Mn: 407 g/mol
Mw: 1970 g/mol
PD*: 4.8
Amino number: 425 mg KOH/g
Viscosity: 9800 mPas @ 40 C and 100 1/s Example 3: Polyamidoamine 3

331.55 g of triethylcitrate were placed in a 1 L four-necked flask equipped with a stirrer a condensation column, a thermometer and a Nitrogen inlet. 430.82 g of Methyldiaminocyclohexane were added dropwise to the reaction flask within 20 minutes under stirring. The reaction mixture was slowly heated up to 143 C (external temperature) and kept at this temperature under stirring for 8 hours. Ethanol was collected as distillate. Then the temperature of the external heat source was reduced to 105 C and slowly the pressure was reduced to 350 mbar within 30 minutes and kept at 350 mbar for further 30 minutes under stirring. Ethanol was further collected as distillate. The reaction temperature was then reduced to 80° C. and 541.7 g of viscous product were collected. The polyamidoamine was solid at room temperature.

The polymer was characterized via Gel Permeation Chromatography in hexafluoroisopropanol and amino numbers:
Mn: 667 g/mol
Mw: 4010 g/mol
PD*: 6
Amino number: 402 mgKOH/g Example 4

Polymer A=Polyamidoamine 1 Ethoxylated with 40 Ethoxy Groups Per Primary Amino Group 122.0 g polyamidoamine 1 from example 1 and 16 g water (10% relative to total amount) were charged in a 2 L autoclave and flushed with nitrogen. The reactor was heated to 120° C. and 35 g ethylene oxide were dosed within 10 minutes and the mixture was stirred overnight. Then, 4 g of an aqueous potassium hydroxide solution (50% wt) were added and the water was removed from the system by heating the reactor to 120° C. under reduced pressure. Subsequently, 30 g ethylene oxide were dosed to reaction mixture within 10 minutes and afterwards 816 g ethylene oxide were added within 16 hours. The reaction mixture was allowed to post-react for 6 hours and subsequently the reactor was cooled to 100° C. The reaction mixture was stripped with nitrogen and volatile compounds were removed in vacuo at 80° C. 1010 g of the ethoxylated polyamidoamine were obtained. The ethoxylated polyamidoamine was liquid at room temperature.

The polymer was characterized by Gel Permeation Chromatography in THF.
Mn (THF): 670 g/mol
MW (THF): 1700 g/mol
PD: 2.5
Total Amine number: 45 mg KOH/g
Tert. Amine number: 42 mg KOH/g
Hydroxyl number: 129 mg KOH/g

Example 5

Polymer B=Polyamidoamine 2 Ethoxylated with 40 Ethoxy Groups Per Primary Amino Group 133.8 g polyamidoamine 2 from example 2 and 16 g water (10% relative to total amount) were charged in a 2 L autoclave and flushed with nitrogen. The reactor was heated to 120° C. and 35 g ethylene oxide were dosed within 10 minutes and the mixture was stirred overnight. Then, 4 g of an aqueous potassium hydroxide solution (50% wt) were added and the water was removed from the system by heating the reactor to 120° C. under reduced pressure. Subsequently, 30 g ethylene oxide were dosed to reaction mixture within 10 minutes and afterwards 816 g ethylene oxide were added within 16 hours. The reaction mixture was allowed to post-react for 6 hours and subsequently the reactor was cooled to 100° C. The reaction mixture was stripped with nitrogen and volatile compounds were removed in vacuo at 80° C. 1020 g of the ethoxylated polyamidoamine were obtained. The ethoxylated polyamidoamine was solid at room temperature.

The polymer was characterized by Gel Permeation Chromatography in THF.
Mn (THF): 3500 g/mol
MW (THF): 6600 g/mol
PD: 1.9
Total Amine number: 59 mg KOH/g
Tert. Amine number: 54 mg KOH/g
Hydroxyl number: 159 mg KOH/g

Example 6

Polymer C=Polyamidoamine 3 Ethoxylated with 38.4 Ethoxy Groups Per Primary Amino Group 145 g polyamidoamine 3 from example 3 and 16 g water (10% relative to total amount) were charged in a 2 L autoclave and flushed with nitrogen. The reactor was heated to 120° C. and 35 g ethylene oxide were dosed within 10 minutes and the mixture is stirred overnight. Then, 4 g of an aqueous potassium hydroxide solution (50% wt) were added and the water was removed from the system by heating the reactor to 120° C. under reduced pressure. Subsequently, 30 g ethylene oxide were dosed to reaction mixture within 10 minutes and afterwards 816 g ethylene oxide were added within 16 hours. The reaction mixture was allowed to post-react for 6 hours and subsequently the reactor was cooled to 100° C. The reaction mixture was stripped with nitrogen and volatile compounds were removed in vacuo at 80° C. 1036 g of the ethoxylated polyamidoamine were obtained. The ethoxylated polyamidoamine was solid at room temperature.

The polymer was characterized by Gel Permeation Chromatography in THF.
Mn (THF): 590 g/mol
MW (THF): 1100 g/mol
PD: 1.9
Total Amine number: 58 mg KOH/g
Tert. Amine number: 55 mg KOH/g
Hydroxyl number: 150 mg KOH/g

Example 7

Polymer D=Polyamidoamine 1 Propoxylated with 24 Propoxy Groups Per Primary Amino Group 74.81 g polyamidoamine 1 from example 1 and 3.74 g water were charged in a 2 L autoclave and flushed with nitrogen. The reactor was heated to 100° C. and 30 g propylene oxide were dosed within 10 minutes and a further 45 g were dosed over 90 minutes. After completion of dosing, the mixture was stirred overnight. Then, 3.7 g of an aqueous potassium hydroxide solution (50% wt) were added and the water was removed from the system by heating the reactor to 120° C. under reduced pressure. Subsequently, 30 g propylene oxide were dosed to reaction mixture within 10 minutes and afterwards 747 g propylene oxide were added over 800 minutes. The reaction mixture was allowed to post-react for 6 hours and subsequently the reactor was cooled to 100° C. The reaction mixture was stripped with nitrogen and volatile compounds were removed in vacuo at 80° C. 899.7 g of the propoxylated polyamidoamine were obtained.

The polymer was characterized by Gel Permeation Chromatography in THF.
Mn (THF): 1700 g/mol
MW (THF): 2200 g/mol
PD: 1.29
Total Amine number: 34 mg KOH/g

APPLICATION EXAMPLES

Materials Used

Polymers A, B, C and D of example 4 to 7 are alkoxylated polyamidoamines. They were used as dispersant for the preparation of a pigment paste. The pigment paste was added to aqueous coating systems.

Sokalan® HP 20 (shortly referred to as Polymer S) was used for comparison; polymer S is an ethoxylated polyethyleneimine solved in water (solid content 80% by weight).

As pigments the carbon black pigments Special Black 100 and Colour Black FW 200 were used.

Polymers A to D were provided as highly viscous solvent-free materials with an active content of 100%. For incorporating Polymers A to D into the respective pigment dispersions the samples were heated up to 60° C. for easier handling. As Polymer S is a solution it could be simply added with increase of temperature. Pigment dispersions were prepared by mixing the components in the respective amounts and milling them down to their primary particle sizes.

The characterization of the pigments used is outlined in Table 1 below. The pigments were selected from the pigment class Pigment Black 7 (PBK 7) and are chemically composed of amorphous carbon from soot by incomplete combustion of hydrocarbons, and having different particle sizes and specific surface areas.

The pigment Color Black FW 200, if well dispersed, leads to rather transparent black coating films due to its small primary particles at <20 nm, and is used for tinting of high quality coatings. Special Black 100 has a slightly larger particle size of 50 nm, is used for mass tones in water-based coatings.

TABLE 1

| Pigments used | | | | |
|---|---|---|---|---|
| Pigment name | Class | Supplier | BET (m2/g) | Average Particle size D50 |
| Special Black 100 | PBk 7 | Orion | 35 | 51 nm |
| Colour Black FW 200 | PBk 7 | Orion | 550 | 13 nm |

At low addition levels of these pigments to a binder system, being less than 10 wt % in the dry film, they can show a transparent behaviour, indicating the quality of the dispersion. The smaller the particle size of the carbon black particle was achieved during the milling step of the pigment paste, the more transparent the dry film appears after its let-down and curing.

Applications Examples for Water Based Systems

The pigment dispersions were prepared by mixing the components in the respective addition level as outlined in Tables 2 and 3 below for each of the pigments at two different DOP levels, by which is meant the percentage of weight of active dispersant on weight of pigment.

Pigment Dispersions

The pigment dispersions are also referred to as pigment pastes.

Pigment pastes were prepared by mixing the components listed in table 2 and 3 and adding glass beads in an amount of 40 g (1 part of weight of glass beads per 1 part of the total weight of all components) The mixtures of table 2 and 3 were Skandex® shaken in parallel for 2 hours at room temperature and the glass beads were removed by filtration. The rheology of the obtained pigment dispersions was measured after 24 hrs by using a Paar Physika UDS 200 rheometer with a cone/plate geometry. Viscosities were measured in the shear rate ranges from 0.01 to 1024 1/s. For evaluation the viscosities at a shear rate of 1.0 1/s were compared, see viscosities of the pigment dispersions in Tables 5 and 6 in mPas.

TABLE 2a pigment dispersions with Special Black 100 (25% pigment, 25% DOP)

| | Pigment dispersion | | | | |
|---|---|---|---|---|---|
| | A1 | B1 | C1 | S1 | O1 |
| Dispersing agent | Polymer A (100%) | Polymer B (100%) | Polymer C 100%) | Sokalan HP 20 (80% in water) | Blank |
| Amount of dispersing agent | 2.50 g | 2.50 g | 2.50 g | 3.13 g | 0.0 g |
| Water | 25.75 g | 25.75 g | 25.75 g | 25.12 g | 25.75 g |
| PEG 300 | 1.75 g | 1.75 g | 1.75 g | 1.75 g | 1.75 g |
| Pigment | 10.0 g | 10.0 g | 10.0 g | 10.0 g | 10.0 g |
| Total | 40.0 g | 40.0 g | 40.0 g | 40.0 g | 40.0 g |

TABLE 2b pigment dispersions with Special Black 100 (25% pigment, 50% DOP)

| | Pigment dispersion | | | |
|---|---|---|---|---|
| | A2 | B2 | C2 | S2 |
| Dispersing agent | Polymer A (100%) | Polymer B (100%) | Polymer C (100%) | Sokalan HP 20 (80% in water) |
| Dispersing agent | 5.00 g | 5.00 g | 5.00 g | 6.25 g |
| Water | 23.25 g | 23.25 g | 23.25 g | 22.00 g |
| PEG 300 | 1.75 g | 1.75 g | 1.75 g | 1.75 g |
| Pigment | 10.0 g | 10.0 g | 10.0 g | 10.0 g |
| Total | 40.0 g | 40.0 g | 40.0 g | 40.0 g |

TABLE 3a pigment dispersion with Colour Black FW 200 (15% pigment, 50% DOP)

| | Pigment dispersion | | | | |
|---|---|---|---|---|---|
| | A3 | B3 | C3 | S3 | O2 |
| Dispersing agent | Polymer A (100%) | Polymer B (100%) | Polymer C (100%) | Sokalan HP 20 (80% in water) | Blank |
| Amount of Dispersing agent | 3.0 g | 3.0 g | 3.0 g | 3.75 g | 0.0 g |
| Water | 31.0 g | 31.0 g | 31.0 g | 30.25 g | 34.0 g |
| Pigment | 6.0 g | 6.0 g | 6.0 g | 6.0 g | 6.0 g |
| Total | 40.0 g | 40.0 g | 40.0 g | 40.0 g | 40.0 g |

TABLE 3b pigment dispersions with Colour Black FW 200 (15% pigment, 100% DOP)

| | Pigment dispersion | | | |
|---|---|---|---|---|
| | A4 | B4 | C4 | S4 |
| Dispersing agent | Polymer A (100%) | Polymer B (100%) | Polymer C (100%) | Sokalan HP 20 (80% in water) |
| Amount Dispersing agent | 6.0 g | 6.0 g | 6.0 g | 7.50 g |
| Water | 28.0 g | 28.0 g | 28.0 g | 26.50 g |
| Pigment | 6.0 g | 6.0 g | 6.0 g | 6.0 g |
| Total | 40.0 g | 40.0 g | 40.0 g | 40.0 g |

Preparation of an Aqueous Based Coating Composition

A paint was prepared by mixing part of the pigment dispersions (pigment paste) with an acrylic water based resin system. As binder NeoCryl® XK-98 was used, which is an ammonia neutralized anionic acrylic copolymer emulsion ex. DSM Coating Resins and provides high gloss, early block resistance and good color development upon tinting.

The details regarding the acrylic water based system are outlined in Table 4 below.

The components listed in Table 4 were added subsequently and stirred with efficient agitation. The wetting agent was added to ensure good flow and levelling of the liquid coating on the substrate.

TABLE 4 components of the pigmented coating composition

| component | Function | w/w % |
|---|---|---|
| Neocryl ® XK-98 (45% solids) DSM Coating Resins | Clear Binder | 83.0% |
| Pigment dispersion from examples above, see Table 5 | Pigment paste | 16.5% |
| Hydropalat ® WE 3220, BASF SE | Wetting Agent | 0.5% |
| | total | 100.00% |

The pigment dispersions were selected to obtain pigmented coatings comprising 4.1 wt % of the pigment Special Black 100 or, alternatively 2.5 wt % of Colour Black FW 200, based on the total weight of the obtained wet pigmented coating which corresponds to 8.8% of Special Black 100 or, alternatively, 5.2% of Colour Black FW 200 based on the dried film.

The pigmented coating was applied to a polyester sheet with a 50 μwire bar coater, and the film was dried overnight at room temperature.

For evaluation the gloss values at a 60°-angle were measured. For the measurements a Byk-Gardner Haze-Gloss-Spectrometer was used.

Negative impacts on appearance were seeding, surface roughness and haze.

Rating for appearance, transparency or opaqueness/hiding power were:
x=not measurable; 1=very poor; 2=poor; 3=mediocre; 4=good; 5=excellent.

The results for the pigmented coatings are outlined in Tables 5 for Special Black 100 and in Table 6 for Colour Black FW 200.

TABLE 5 results for pigmented coatings comprising Special Black 100

| DOP | Pigment dispersion | Viscosity of the pigment dispersion, mPas | Gloss of the coating at 60° | Transparency of the coating | Appearance of the coating |
|---|---|---|---|---|---|
| 0% | O1 | 28400 | 66 | x not dispersed | 1 flocculated |
| 25% | S1 (comparison) | 825 | 79 | 2 | 4 |
| 50% | S2 (comparison) | 715 | 80 | 3 | 3 |
| 25% | A1 | 1070 | 77 | 4 | 5 |
| 50% | A2 | 735 | 77 | 3 | 5 |
| 25% | B1 | 1090 | 78 | 4 | 5 |
| 50% | B2 | 1020 | 80 | 4 | 5 |
| 25% | C1 | 1100 | 76 | 3 | 4 |
| 50% | C2 | 1010 | 80 | 4 | 5 |

TABLE 6 results for pigmented coatings comprising Colour Black FW 200

| DOP | Pigment dispersion | Viscosity of the pigment dispersion, mPas | Gloss of the coating at 60° | Transparency of the coating | Appearance of the coating |
|---|---|---|---|---|---|
| 0% | O2 | 22'200 | 74 | 2 | 2 flocculated |
| 50% | S3 (comparison) | 112'000 | 83 | 4 | 5 |
| 100% | S4 (comparison) | 50 | 84 | 5 | 5 |
| 50% | A3 | 86'800 | 70 | 3 | 3 |
| 100% | A4 | 1'600 | 82 | 4 | 5 |
| 50% | B3 | 70'100 | 82 | 4 | 5 |
| 100% | B4 | 450 | 83 | 5 | 5 |
| 50% | C3 | 87'200 | 78 | 4 | 4 |
| 100% | C4 | 95 | 83 | 5 | 5 |

It can be seen from Table 5 and 6 that the use of the pigment dispersions comprising alkoxylated polyamidoamines show clearly improved properties in comparison to the blank experiment. In particular, it can be seen that the coatings with pigment dispersions A1 to A4, B1 to B4 and C1 to C4 show good performance in the order of magnitude for gloss, transparency, appearance of the coating obtained. In addition, the viscosity of the pigment dispersions A1-A4, B1-B4 and C1 to C4 compared to pigment dispersions S1 to S4, at both 25% and 50% addition level of dispersant on pigment Special Black 100 is in the same range.

At a level of 100% DOP a comparable performance on pigment Colour Black FW 200 with regard to the film gloss, viscosity and transparency was found. At a lower level of 50% DOP on Colour Black FW 200, slightly improved viscosities of the pigment dispersions were found compared to pigment dispersions S1 to S4.

In case of Special Black 100, in general a better transparency was obtained for the coatings with pigment dispersions A1 to A4, B1 to B4 and C1 to C4, as compared to coatings with pigment dispersions S1 to S4, indicating a better dispersion to smaller particle sizes.

Application Examples for an Organic Solvent Based Systems

The following section concerns the testing of alkoxylated polyamidoamines as dispersing agent with regard to their dispersing efficiency for carbon black pigment Colour Black FW 200 in a solvent-based coating system as shown in Table 7.

The pigment dispersions were prepared as described above. The pigment dispersion comprised 1-methoxy-2-propyl acetate as solvent.

TABLE 7 pigment dispersions with Colour Black FW 200 (15% pigment)

| | Pigment dispersion | | |
|---|---|---|---|
| | D1 | D2 | O3 |
| Dispersing agent | 3.54 g of Polymer D (corresponding to 59% DOP) | 7.0 g of Polymer D (corresponding to 117% DOP) | — |
| 1-Methoxy-2-propyl acetate | 30.46 g | 27.0 g | 34.0 g |
| Pigment | 60 g | 6.0 g | 6.0 g |
| Total | 40.0 g | 40.0 g | 40.0 g |

A paint was prepared by mixing part of the obtained pigment dispersion with a medium solid stoving enamel system.

The medium solid stoving enamel was composed as shown in Table 8.

TABLE 8 composition of the medium solid stoving enamel

| component | Function | w/w % |
|---|---|---|
| Setal 173 VS-60 From Allnex | Saturated polyester binder | 24.7% |
| CAB 381.2 & CAB 381.20 (ratio 72/28) From Eastman | Cellulose acetate binder | 23.1% |
| Maprenal MF 650 From Ineos | Melamine crosslinker | 11.5% |
| Resamine HF 480 From Allnex | Plasticizer Resin | 2.9% |
| Butyl Acetate From BASF | Solvent | 18.9% |
| Xylene From BASF | Solvent | 18.9% |
| | total | 100.00% |

The components of the medium solid stoving enamel were mixed and stirred with efficient agitation.

10 parts by weight of the pigments dispersions D1, D2 or D3 were added to 90 parts by weight of the medium solid stoving enamel.

The final pigmented coating (wet) that was applied on the substrate thus contained 1.5 wt.-% of the pigment Colour Black FW 200, based on the total weight of the obtained wet pigmented coating and 3 wt % based on the cured film.

The final pigmented coating was applied to a polyester sheet with a 50 μwire bar coater, left at RT for 10 min for flash off and cured in an ventilated oven at 130° C. for 30 min.

For evaluation, the gloss values at a 20°-angle and 60°-angle, were measured. For the measurements a Byk-Gardner Haze-Gloss-Spectrometer was used.

Negative impacts on appearance were seeding, surface roughness and haze.

Rating for transparency and appearance were:
x=not measureable; 1=very poor; 2=poor; 3=mediocre; 4=good; 5=excellent.

The results for the pigmented coating are outlined in the following Table 9.

TABLE 9 results for pigmented coatings with pigment dispersion O3, D1 or D2

| Pigment dispersion | physical condition of the pigment dispersion visual | Gloss at 20° | Gloss at 60° | Transparency of the coating | Appearance of the coating |
|---|---|---|---|---|---|
| O3 | solid | 21 | 56 | x flocculated | 1 flocculated |
| D1 | liquid | 61 | 87 | 3 | 3 |
| D2 | liquid | 82 | 93 | 5 | 4 |

It can be seen from Table 9 that the coating compositions and obtained coatings showed clearly improved optical properties with the alkoxylated polyamidoamines in comparison to the blank experiment on Colour Black FW 200. In particular, it can be seen that the coating with pigment dispersions D1 and D2 showed a clear advantage in gloss values at both 20 and 60° in comparison to a blank experiment. The improved pigment dispersion can also be concluded from the fact that the obtained pigment dispersions were solid without the alkoxylated polyamidoamines. The film transparency and appearance of the coatings with pigment dispersions D1 and D2 were clearly enhanced.

The invention claimed is:

1. An alkoxylated polyamidoamine obtainable by:
   a) reacting a polycarboxylic compound having a total number TN of carboxylic groups of 3 to 10
   with a primary diamine of formula I:

$H_2N—Z—NH_2$ wherein Z represents a bond or an organic group with 1 to 20 carbon atoms in a ratio of 0.3 TN to TN mols of the diamine per 1 mol of the polycarboxylic compound, and
   b) alkoxylating the product obtained in a) with at least 0.5 mol of alkyleneoxide per 1 mol of primary amino groups.

2. The alkoxylated polyamidoamine according to claim 1, wherein the carboxylic groups are selected from carboxylic acid groups, carboxylic halogenid groups, carboxylic ester groups, carboxylic anhydride groups, and mixtures thereof, whereby a carboxylic anhydride group corresponds to two carboxylic groups.

3. The alkoxylated polyamidoamine according to claim 1, wherein the carboxylic compound is a compound of formula II:

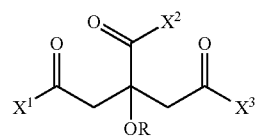

wherein $X^1$ to $X^3$ independently from each other represent a halogenid, cyanide or a group O—$R^1$ with $R^1$ being hydrogen or an organic group with at maximum 30 carbon atoms, and
R represents hydrogen or a group C(=O)—$R^2$ with $R^2$ being an organic group with at maximum 30 carbon atoms.

4. The alkoxylated polyamidoamine of claim 1, wherein Z in formula I is an aliphatic hydrocarbon group comprising a cycloaliphatic ring system.

5. The alkoxylated polyamidoamine of claim 1, wherein the diamine of formula I is 1-methyl-2,4-diamine-cyclohexane, 1-methyl-2,6-diamine-cyclohexane or mixtures thereof.

6. The alkoxylated polyamidoamine of claim 1, wherein the polycarboxylic compound and the diamine are reacted in a ratio of 0.3 TN to 0.98 TN mols of the diamine per 1 mol of the polycarboxylic compound.

7. The alkoxylated polyamidoamine of claim 1, wherein the polyamidoamine obtained in step a) has an amine number of 100 to 1500 mg KOH/g.

8. The alkoxylated polyamidoamine of claim 1, wherein the alkyleneoxide used in step b) is an alkyleneoxide with 2 to 6 carbon atoms.

9. The alkoxylated amidoamine of claim 1, wherein the degree of alkoxylation of the alkoxylated polyamidoamine is 0.5 to 100 mols of alkyleneoxide per 1 mol of primary amino groups of the polyamidoamine obtained in step a).

10. The alkoxylated polyamidoamine of claim 1, wherein the alkoxylated polyamidoamine has a number average molecular weight (Mn) of 300 to 50.000 g/mol.

11. A method of using the alkoxylated polyamidoamine of claim 1, the method comprising using the alkoxylated polyamidoamine as a dispersant.

12. A method of using the alkoxylated polyamidoamine of claim 1, the method comprising using the alkoxylated polyamidoamine as a dispersant for the preparation of pigment dispersions.

13. Pigment dispersions comprising:
   a pigment,
   the alkoxylated polyamidoamine of claim 1, and
   a solvent selected from water, organic solvents, or mixtures thereof.

14. A method of using the pigment dispersions of claim 13, the method comprising using the pigment dispersions for the preparation of aqueous or organic solvent based coating compositions, adhesives, or sealants.

* * * * *